(12) United States Patent
Strat et al.

(10) Patent No.: US 8,913,781 B2
(45) Date of Patent: Dec. 16, 2014

(54) METHODS AND SYSTEMS FOR AUDIENCE MONITORING

(75) Inventors: Tom Strat, Oakton, VA (US); Qinfen Zheng, Ellicott City, MD (US)

(73) Assignee: SET Corporation, Arlington, VA (US)

( * ) Notice: Subject to any disclaimer, the term of this patent is extended or adjusted under 35 U.S.C. 154(b) by 843 days.

(21) Appl. No.: 12/464,191

(22) Filed: May 12, 2009

(65) Prior Publication Data

US 2010/0046797 A1 Feb. 25, 2010

Related U.S. Application Data

(60) Provisional application No. 61/090,398, filed on Aug. 20, 2008.

(51) Int. Cl.
*G06K 9/00* (2006.01)
*H04H 60/45* (2008.01)
*H04N 7/173* (2011.01)
*H04N 21/4223* (2011.01)
*H04N 21/44* (2011.01)
*H04N 21/442* (2011.01)
*H04N 21/658* (2011.01)

(52) U.S. Cl.
CPC .......... *G06K 9/00778* (2013.01); *H04H 60/45* (2013.01); *H04N 7/173* (2013.01); *H04N 21/4223* (2013.01); *H04N 21/44008* (2013.01); *H04N 21/44218* (2013.01); *H04N 21/6582* (2013.01)
USPC ........................................................ 382/103

(58) Field of Classification Search
CPC .... G06K 9/00778; G06T 15/04; H04H 60/45; H04N 21/4223; H04N 21/44008; H04N 21/44218; H04N 21/6582; H04N 7/173
USPC ........................................................ 382/103
See application file for complete search history.

(56) References Cited

U.S. PATENT DOCUMENTS

| | | | |
|---|---|---|---|
| 2006/0102843 A1* | 5/2006 | Bazakos et al. | 250/339.05 |
| 2007/0047761 A1* | 3/2007 | Wasilunas et al. | 382/100 |
| 2007/0153091 A1* | 7/2007 | Watlington et al. | 348/208.14 |
| 2007/0160289 A1* | 7/2007 | Lipton et al. | 382/173 |
| 2007/0183622 A1* | 8/2007 | Hannigan et al. | 382/100 |
| 2008/0172781 A1* | 7/2008 | Popowich et al. | 4/476 |
| 2009/0158309 A1* | 6/2009 | Moon et al. | 725/12 |

* cited by examiner

*Primary Examiner* — Tom Y Lu
(74) *Attorney, Agent, or Firm* — Arent Fox LLP

(57) ABSTRACT

Systems and methods for audience monitoring are provided that include receiving an input including a recording or live feed of an audience composed of several persons, detecting foreground of the input, performing blob segmentation of the input, and analyzing human presence on each segmented blob by identifying at least one person, identifying a spatial distribution of at least one identified person, determining a dwell time of at least one identified person, determining a temporal distribution of at least one identified person, and determining a gaze direction of at least one identified person. Such detecting provides the ability to track individual persons present in the audience, and how long they remain in the audience. The method also provides the ability to determine gaze direction of persons in the audience, and how long one or more persons are gazing in a particular direction.

29 Claims, 4 Drawing Sheets

METHODS AND SYSTEMS FOR AUDIENCE MONITORING

This application claims priority from U.S. Provisional Patent Application No. 61/090,398, titled "Method and System for Audience Monitoring" and filed on Aug. 20, 2008, and which is incorporated by reference herein in its entirety.

BACKGROUND OF THE INVENTION

1. Field of Invention

The present invention relates to methods and system for monitoring an area in space via an image capturing device. More particularly, the present invention relates to monitoring an audience in an area in space.

2. Description of Related Art

A variety of human detection technologies are well known in the art. Audience counting systems via video provide a count of people entering and exiting a particular passageway or establishment. For instance, an audience counting system may provide a beam, e.g., an infrared beam, across the passageway to be monitored. As people enter or exit the passageway, the beam is temporarily interrupted, and a counter increases by one increment each time the beam is interrupted, thus counting the number of people that have crossed the beam. The audience counting system detects this interruption and increments or decrements its net internal count of people entering the passageway.

In addition, other human counting systems that report on the direction of travel of people through a particular passageway are available, but these systems tend to be complex and expensive. For example, directional counting systems utilize a foot-activated pressure-sensitive platform at the entry point of the passageway. Based on a pressure profile related to the engagement of an individual's foot with the platform, the system predicts the direction of travel of the individual.

Other human counting systems are coupled with electronic article surveillance systems and an alarm management unit. In such systems, the alarm management unit accepts the electronic article surveillance data signal from the electronic article surveillance system, and a human count signal from the human counting system, for facilitating correlation of electronic article surveillance and human count data.

However, none of these techniques provides an accurate counting per unit of time and space, or an accurate evaluation of the gaze of one or more members, of an audience being monitored by, for example, a video camera.

SUMMARY OF THE INVENTION

In light of the above-described problems and unmet needs as well as others, aspects of the present application provide systems and methods for audience monitoring that include receiving an input of audience imaging information such as an audience, including, for example, an analog or digital recording or live camera feed, detecting a foreground on the input, performing blob segmentation on the input, and identifying and analyzing human presence in each segmented blob. It should be noted that foreground may be detected contemporaneously with, or after, the input is received. Such detection may provide for the ability to track individuals present in the audience, as well as the ability to track a period of time during which the individual persons remain part of the audience. Aspects of the methods and systems also provide for the ability to determine gaze direction of one or more persons in the audience, as well as how long each person is gazing in a particular direction.

Aspects of the present invention allow for real-time television (TV) audience monitoring technology to be used for estimation of the size and demographics of a given TV audience. Exemplary aspects may include live or recorded camera input, foreground segmentation, human tracking, human head detection and localization, gaze direction determination, height estimation, and dwell estimation. In particular, human detection may be achieved using a spatio-temporal variance analysis algorithm for moving target detection, while human gaze may be determined using a facial symmetry analysis algorithm. An exemplary system, according to various aspects of the present invention, may be operated in real time on an audience that contains multiple persons. Another exemplary system, according to aspects of the present invention, may be operated on previously recorded audiences containing multiple persons.

Exemplary aspects of the present invention include audience estimation for both in-home and out-of-home TV viewing. Human detection may provide the size of the audience as a function of time, dwell estimation may measure the amount of time an individual is present in the audience, gaze estimation may determine whether or not a person is looking at a specific location, such as the camera or a TV monitor, and height and skin tone estimation may provide evidence of, for example, age, gender, ethnic makeup, as well as other features, of some or all of the persons in the audience. Audience measurement may be used to set the value of TV advertising, such as Nielsen ratings, as well as for advertisements displayed on TV monitors in retail establishments and public spaces. Automated audience measurement may provide increased accuracy in tracking viewership, thereby allowing increased advertisement revenues and the opportunity to customize content presentation based on the makeup of the audience on a continual and/or permanent basis.

Additional advantages and novel features of these aspects of the invention will be set forth in part in the description that follows, and in part will become more apparent to those skilled in the art upon examination of the following or upon learning by practice of the invention.

BRIEF DESCRIPTION OF THE DRAWINGS

Various exemplary aspects of the systems and methods will be described in detail, with reference to the following figures, wherein.

DETAILED DESCRIPTION OF PREFERRED ASPECTS

These and other features and advantages of aspects of this invention are described in, or are apparent from, the following detailed description of various exemplary aspects of the invention.

Figure 1:
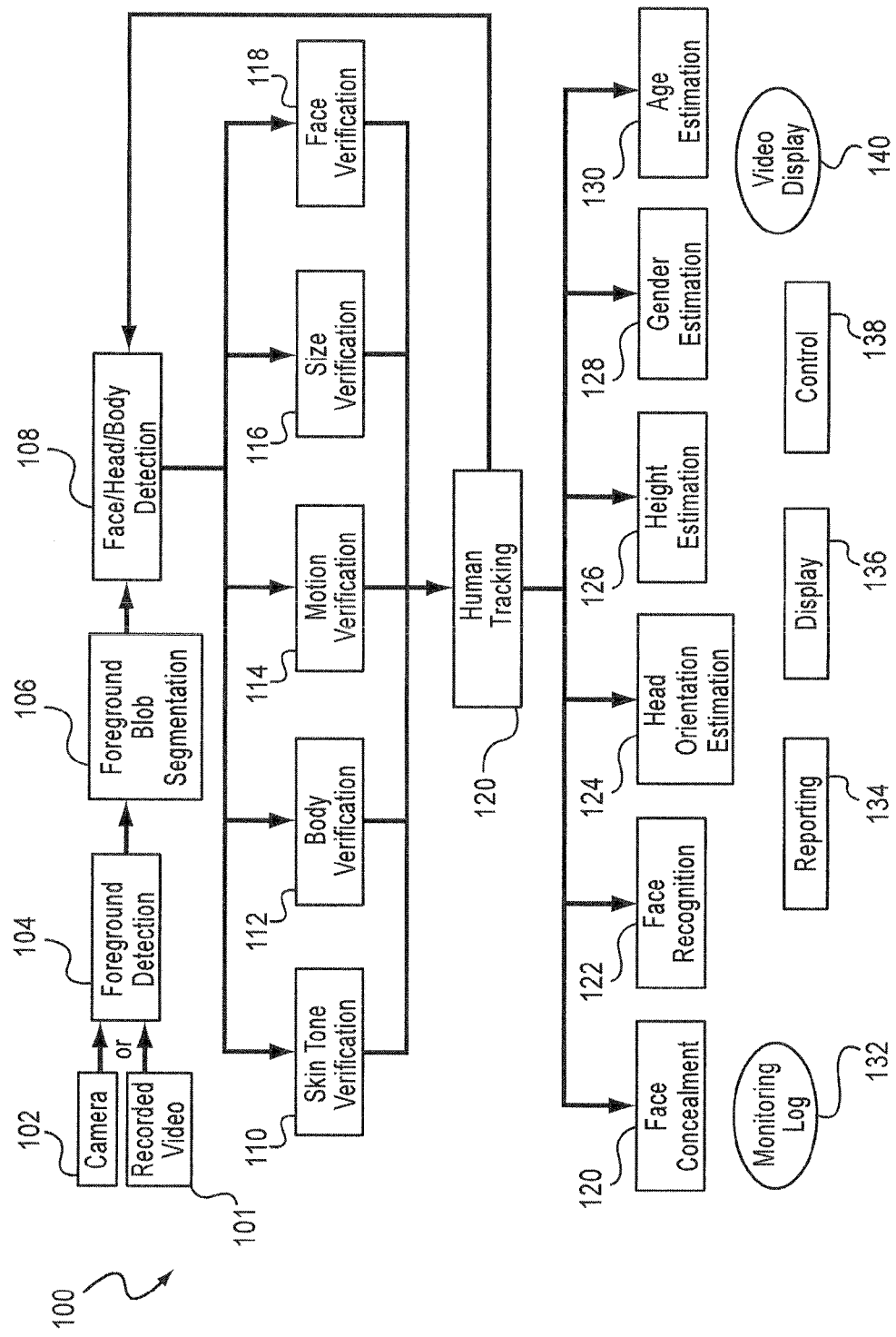
FIG. 1 is a chart illustrating a method of audience monitoring according to aspects of the present invention.

FIG. 1 is a chart illustrating an exemplary method 100 for audience monitoring according to aspects of the present invention. Aspects of the present invention include real-time or recorded TV audience monitoring for automatic estimation of various parameters, such as the size, demographics, and dwell time of a TV audience. The source of image data for monitoring can be that of an audience recorded live via a camera 102, or that of an audience that was recorded prior to the monitoring and analysis, such as may be contained in a previously recorded video 101. Accordingly, both the signal of a live camera 102 and/or of a recorded video 101 can be analyzed. Once the audience is recorded, or a live feed is received, foreground detection 104 using a foreground detector may be achieved using, for example, a spatio-temporal variance analysis algorithm for moving object detection. According to various aspects of the current invention, foreground detection 104 via the foreground detector allows a user to determine what portion of the recording is stationary and is part of the physical background or backdrop of the recording, and what portion of the recording is the foreground, which includes the audience. It should be noted that foreground may be detected contemporaneously with, or after, the input is received. Once foreground detection is performed, foreground blob segmentation 106 via a blob segmentor can be performed.

According to various aspects of the current invention as referred to herein, foreground blob segmentation 106 may include the segmentation of one or more portions of space in the recording or live feed that are determined to be the foreground into multiple blobs, each blob having the approximate size of, or possibly corresponding to, a typical human head. Blob segmentation also includes detection 108 of a face, head or body to determine whether a given area of the foreground may correspond to a human head or body portion on the basis of several parameters. According to various aspects of the current invention, exemplary parameters relied on during blob segmentation can include, for example, changes in illumination, changes in color, spatial positioning, height, and the like. These aspects of the present invention avoid or reduce the need for performing complicated analyses such as background modeling. These aspects also quickly adapt to sensor motion and illumination changes, and use relatively small memory storage. Once blob segmentation is performed in 106, face detection 108 can be performed on the blobs identified as possibly corresponding to, for example, or a human head.

According to various aspects of the current invention, face detection 108 can also rely on such techniques as skin tone verification 110, body verification 112, motion verification 114, size verification 116, or face verification 118. For example, skin tone verification 110 compares the various colors present within each segmented blob to typical human skin colors, and determines whether a given segmented blob may include a portion of human skin. Body verification 112 may compare the various shapes present within each segmented blob to typical human shapes and determine whether the segmented blob may include a portion of a human body. Motion verification 114 may compare any motion detected in a segmented blob to typical human movement and determines whether the segmented blob may include a moving human body. Size verification 116 may compare the various shapes present within each segmented blob to typical human features and determine whether the segmented blob may include a portion of a human body. Face verification 118 may compare the various shapes present within each segmented blob to typical human faces and determine whether the segmented blob may include a human face. According to aspects of the present invention, face detection 108 may be performed on candidate areas screened by foreground detection, and on areas identified via blob segmentation. Aspects of the present invention may use, for example, Canny edge detection, which is a multi-stage algorithm designed to detect a wide range of edges in an image, and Haar pattern matching algorithms, to detect faces. Other algorithms may be used to detect human heads or body portions. According to aspects of the invention, false face detection may be avoided by applying, for example, the above-discussed skin tone verification 110, body verification 112, motion verification 114, size verification 116 and face verification 118 concurrently on a same area or blob.

According to various aspects of the current invention, once segmented blobs are determined to correspond to a human head, the detected human heads may be tracked over time via human tracking 120, based on appearance and motion signature, so that individual persons may be identified and counted. Accordingly, double counting of individuals can be avoided. The duration that each individual person remains in the field of view of the camera, or dwell time, may be determined via head tracking 120, and may be recorded in a monitoring log. Optionally, demographic information for each individual may be estimated from the video camera feed. Examples of demographic information that may be determined include, but are not limited to, height estimation 126, gender estimation 128, and age estimation 130. It should be noted that although not illustrated in FIG. 1, ethnicity estimation may also be performed according to aspects of this invention. The information thus gathered can be transmitted in real time to a monitoring person or process, or can be recorded in electronic form for later analysis.

Furthermore, human gaze may also be determined using a facial symmetry analysis algorithm via a head orientation estimation 124 and face recognition 122. Aspects of the present invention provide for the recognition of possible locations of eyes, nose, and mouth, and may also determine head position and orientation 124 based on the strength and relative position of the eyes, nose, mouth, and head tilt. According to these aspects of the present invention, it is possible to determine how many people are looking at the camera, or at another location, based on an analysis of the head gaze or head orientation of one or more of the persons in the audience. Thus, a determination of the gaze time of each person of the audience can be determined for one or more locations. For example, it is possible to determine how many people are looking at a piece of art hung on a wall, at the camera, or at an advertisement, and how long they have been looking at it.

It should be noted that, in order to, for example, preserve the privacy of the audience, the faces of the people identified as being part of the audience and detected via human tracking 120 as discussed above can also be hidden from view on the recording or live camera feed via face concealment 120. For example, on the input, the faces of one or more of the individuals in the audience can be concealed by, for example, blurring, pixelating, or other similar technique.

According to various aspects of the current invention, once one or more of the people present in the audience are identified and their movement, location and gaze are tracked, a report may be generated about the movement of the one or more people in the field of vision, the duration of their appearance in the field of vision, their gaze direction and duration, and the like. Accordingly, an accurate description of the movements of one or more people present in the field of vision of the camera, the dwell time of each person in the field of vision, and various directions in which they gaze, may be generated. Such description may be used in advertising campaigns, prevention and outreach initiatives, and the like.

Figure 2:
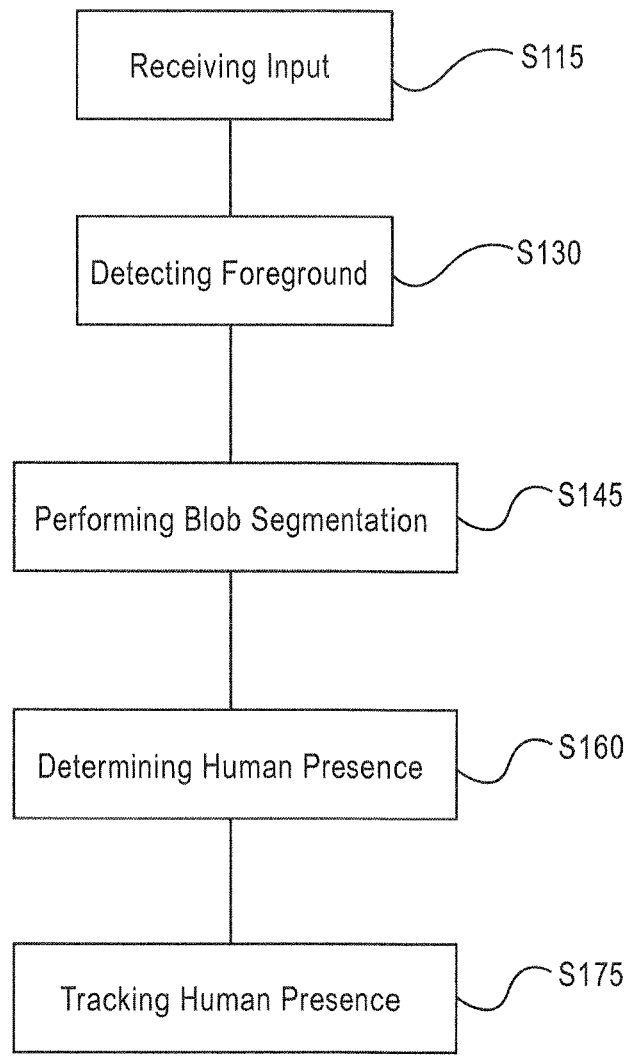
FIG. 2 is a flow diagram illustrating a method of audience monitoring according to aspects of the present invention.

FIG. 2 is a flow diagram illustrating a method of audience monitoring according to aspects of the present invention. In FIG. 2, the method starts in S115, where an input of audience imaging information is received. According to aspects of the invention, the input may be a recording of an audience in a given portion of space, and the recording may be performed by an image capturing device such as a camera. The input may be image data for a pre-recorded audience or a live recording. Once the input is received, the method continues to S130, where the foreground of the input is detected. In order to detect the foreground, both the foreground and the background of the recording may first be separated from each other. According to various aspects of the invention, the foreground may be separated from the background of the recording via spatio-temporal analysis by, for example, eliminating features that remain stationary over a predetermined period of time. Thus, a feature that is in a stationary state over a predetermined period of time may be deemed not to be a human head, or other human body portion, and is thus part of the background. According to various aspects of the current invention, other techniques of separation of the foreground from the background of the recording may include detecting a change in lighting of a given feature, detecting a color of the feature, and detecting a size of the feature, among other parameters. For example, if a feature is moving in the field of vision, it may be deemed to be part of the foreground. Next, the method continues to S145, wherein blob segmentation is performed.

According to various aspects of the present invention, blob segmentation in S145 includes determining smaller areas of the field of vision that may correspond to human heads. This determination can be made on the basis of the location of the blob in the field of vision or area being recorded or monitored, the coloring of the blob, the geometric location of various spots on the blob that possibly correspond to eyes, mouth and nose relatively to each other, and the like. Next, the method continues to S160, wherein human presence is determined.

According to various aspects of the present invention, human presence can be determined in S160 when the analysis of the segmented blobs indicate that the blob corresponds to a human head based on the above-discussed parameters. The analysis of a segmented blob can be accomplished by, for example, comparing the various features in the segmented blob with typical characteristics of a human head. These characteristics may include determination, for example, of whether the color of a given portion of the blob corresponds to the color of human skin, or whether the shape of a given portion of the blob could correspond to a human head or a body portion. The analysis can also include the determination of whether a plurality of portions of the blob correspond to various body portions, and whether they relate to each other in space consistently with the way various body portions of a human being relate to each other. For example, if a portion of the blob that appears to correspond to a human head is located directly above a portion of the blob that appears to correspond to a human torso, then the combination of these portions of the blob indicates the likely presence of a human body.

Furthermore, an analysis of the segmented blobs can yield a determination of the gaze of a person whose head was previously detected in a segmented blob. The analysis of gaze determination can be performed on the basis of the person's head tilt, the location of the spots corresponding to the person's eyes, the general direction or orientation of the face, and the like. Gaze determination can lead to the determination of the direction in which the head, and thus the person, is looking. Next, the method continues to S175, where the human presence is tracked.

According to various aspects of the present invention, human presence and behavior can be tracked by measuring, among other things, the dwell time of a particular identified person in the field of vision of a recording device: the number of times the person enters/exits the field of vision; the direction in which the person looks; and/or the period of time for which the person is looking in that direction. Accordingly, behavioral information of one or more of the persons present in the field of vision can be obtained from such tracking. According to various aspects of the present invention, a statistical analysis may be performed on one or more of the persons in an audience, and a report may be generated regarding the audience as a whole, or regarding one or more of the persons within the audience. The statistical analysis may determine several parameters. For example, these parameters may include the length of time during which one or more persons dwell in the area being monitored or recorded, the number of times one or more persons enter/exit the area and/or the field of vision of the camera recording or monitoring the audience, the length of time for which one or more persons look in a given direction, and the like. A distribution of such behavior for each detected person in the audience, along with a combined distribution of more than one person in the audience can thus be calculated for each one of these, and other, parameters.

Figure 3:
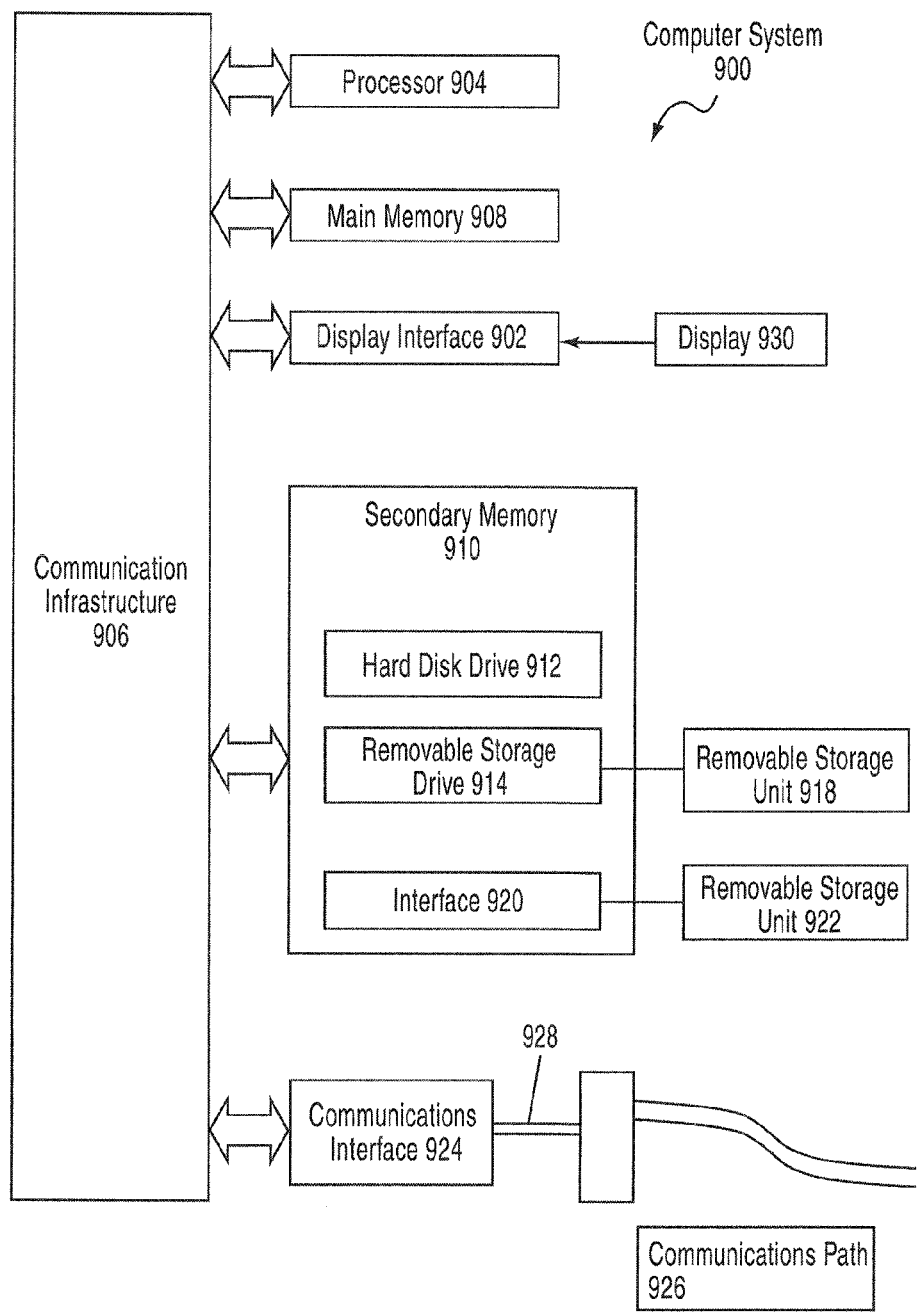
FIG. 3 presents an exemplary system diagram of various hardware components and other features, for use in accordance with an aspect of the present invention.

FIG. 3 presents an exemplary system diagram of various hardware components and other features, for use in accordance with an aspect of the present invention. The present invention may be implemented using hardware, software, or a combination thereof and may be implemented in one or more computer systems or other processing systems. In one aspect, the invention is directed toward one or more computer systems capable of carrying out the functionality described herein. An example of such a computer system 900 is shown in FIG. 3.

Computer system 900 includes one or more processors, such as processor 904. The processor 904 is connected to a communication infrastructure 906 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 900 can include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels.

In this document, the terms "computer program medium" and "computer usable medium" are used to refer generally to media such as a removable storage drive 980, a hard disk installed in hard disk drive 970, and signals 928. These computer program products provide software to the computer system 900. The invention is directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features of the present invention, as discussed herein. In particular, the computer programs, when executed, enable the processor 910 to perform the features of the present invention. Accordingly, such computer programs represent controllers of the computer system 900.

In an aspect where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 4:
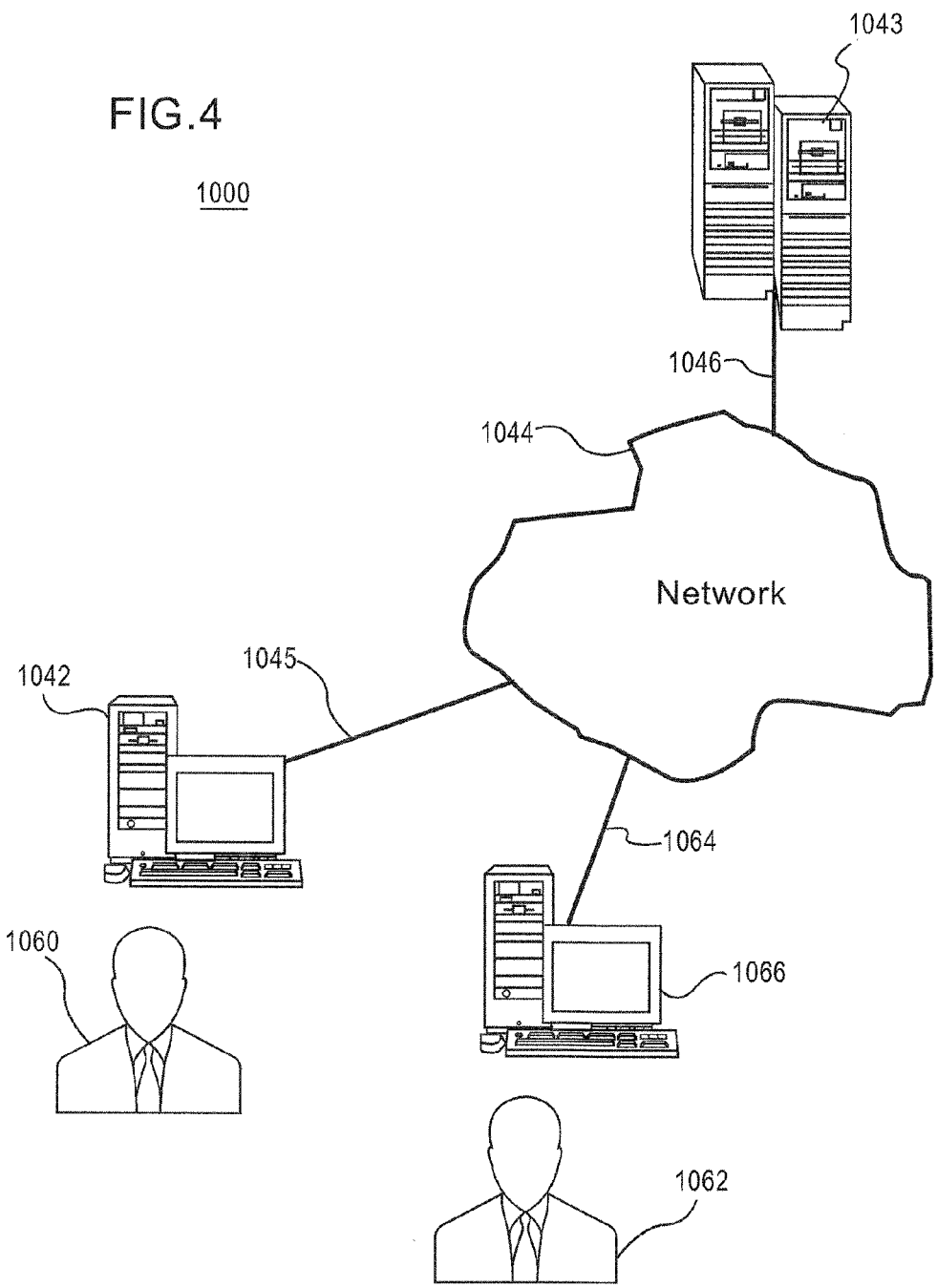
FIG. 4 is a block diagram of various exemplary system components, in accordance with an aspect of the present invention.

FIG. 4 is a block diagram of various exemplary system components, in accordance with an aspect of the present invention. FIG. 4 shows a communication system 1000 usable in accordance with the present invention. The communication system 1000 includes one or more accessors 1060, 1062 (also referred to interchangeably herein as one or more "users") and one or more terminals 1042, 1066. In one aspect, data for use in accordance with the present invention is, for example, input and/or accessed by accessors 1060,1064 via terminals 1042,1066, such as cameras, image capturing devices, personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 include, for example, wired, wireless, or fiberoptic links. In another aspect, the method and system of the present invention operate in a stand-alone environment, such as on a single terminal.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A method for audience monitoring, comprising:
   receiving an input of audience imaging information;
   detecting a foreground of the received input;
   performing blob segmentation on the detected foreground of the received input to generate segmented blobs of the detected foreground;
   analyzing at least one segmented blob for detecting presence of at least one person by performing at least one operation selected from a group consisting of: skin tone verification, body verification, motion verification, size verification, and face verification; and
   determining false human presence via the skin tone verification and the size verification in the at least one segmented blob.

2. The method of claim 1, wherein detecting the foreground includes separating the foreground of the received input from a background of the received input.

3. The method of claim 2, wherein detecting the foreground includes performing a spatio-temporal analysis.

4. The method of claim 1, wherein performing blob segmentation includes analyzing motion and illumination of the audience.

5. The method of claim 1, wherein detecting the foreground is performed contemporaneously with or after the input is received.

6. The method of claim 1, wherein analyzing the at least one segmented blob for detecting presence of at least one person comprises determining a probable human presence via analysis of the blob segmentation.

7. The method of claim 6, wherein the probable human presence is determined via a process selected from a group consisting of Canny edge detection and Haar pattern matching.

8. The method of claim 1, further comprising determining a gaze direction of the detected at least one person, based on application of a facial symmetry analysis algorithm to the at least one person.

9. The method of claim 1, further comprising determining demographic information about the detected at least one person.

10. The method of claim 1, further comprising concealing faces of at least one of the persons.

11. The method of claim 10, wherein concealing the face comprises: blurring the face.

12. The method of claim 10, wherein concealing the face comprises: pixelating the face.

13. The method of claim 1, wherein the at least one segmented blob corresponds to an image of a possible human head.

14. The method of claim 1, further comprising determining an area that corresponds to a possible head in the at least one segmented blob.

15. The method of claim 1, wherein the skin tone verification comprises skin color comparison and the size verification comprises head size comparison.

16. A system for audience monitoring, the system comprising:
- a receiver that receives an input of audience imaging information;
- a detector that detects a foreground of the received input;
- a blob segmentor that performs blob segmentation on the foreground of the received input to generate segmented blobs of the detected foreground; and
- a human presence analyzer configured to:
  - analyze at least one segmented blob for detecting presence of at least one person by performing at least one operation selected from a group consisting of: skin tone verification, body verification, motion verification, size verification, and face verification; and
  - determine false human presence via the skin tone verification and the size verification in the at least one segmented blob.

17. The system of claim 16, wherein the detector comprises a spatio-temporal analyzer.

18. The system of claim 16, wherein the human presence analyzer comprises a facial symmetry analyzer.

19. The system of claim 16, further comprising a human presence tracker that tracks human presence at least one of temporally and spatially.

20. The system of claim 16, further comprising a face concealer that conceals faces of at least one of the persons in the audience.

21. The system of claim 20, wherein the face concealer comprises at least one of a face blurrer and a face pixelator.

22. A system for audience monitoring, the system comprising:
- at least one processor configured to:
- receive an input of audience imaging information;
- detect a foreground of the received input;
- perform blob segmentation on the foreground of the received input to generate segmented blobs;
- analyze at least one segmented blob for detecting presence of at least one person by performing at least one selected operation from a group consisting of: skin tone verification, body verification, motion verification, size verification, and face verification; and
- determine false human presence via the skin tone verification and the size verification in the at least one segmented blob.

23. The system of claim 22, wherein the system comprises a terminal.

24. The system of claim 23, wherein the terminal is selected from a group consisting of a personal computer, a minicomputer, a main frame computer, a microcomputer, a hand held device, and a telephonic device.

25. The system of claim 22, wherein the system comprises a server.

26. The system of claim 25, wherein the server is selected from a group consisting of a personal computer, a minicomputer, a microcomputer, and a main frame computer.

27. The system of claim 26, wherein the server is coupled to a network.

28. The system of claim 27, wherein the server is coupled to the network via a coupling, wherein the coupling is selected from a group consisting of a wired connection, a wireless connection, and a fiberoptic connection.

29. A computer program product comprising a non-transitory computer readable medium having control logic stored therein for causing a computer to exchange user-generated community information, the control logic comprising:
- code for receiving an input of audience imaging information;
- code for detecting a foreground of the received input;
- code for performing blob segmentation on the foreground of the received input to generate segmented blobs;
- code for analyzing at least one segmented blob for detecting presence of at least one person by performing at least one operation selected from a group consisting of: skin tone verification, body verification, motion verification, size verification, and face verification; and
- determine false human presence via the skin tone verification and the size verification in the at least one segmented blob.

* * * * *